United States Patent
Gilbert

(10) Patent No.: US 6,357,011 B2
(45) Date of Patent: *Mar. 12, 2002

(54) BUS-POWERED COMPUTER PERIPHERAL WITH SUPPLEMENT BATTERY POWER TO OVERCOME BUS-POWER LIMIT

(75) Inventor: Timothy G. Gilbert, Vermillion, SD (US)

(73) Assignee: Gateway, Inc., N. Sioux, SD (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/115,843

(22) Filed: Jul. 15, 1998

(51) Int. Cl.[7] ............................. G06F 1/26; G06F 1/28; G06F 1/30
(52) U.S. Cl. ........................ 713/300; 713/310; 713/320; 320/34
(58) Field of Search ................................ 713/300, 310, 713/320; 709/238; 702/122; 326/34; 400/88

(56) References Cited

U.S. PATENT DOCUMENTS

| | | | | |
|---|---|---|---|---|
| 3,686,549 A | * | 8/1972 | Winebrener | 348/139 |
| 3,771,039 A | | 11/1973 | Stewart | 320/140 |
| 3,777,247 A | | 12/1973 | Zellmer | 320/140 |
| 3,968,333 A | | 7/1976 | Simokat et al. | 379/413 |
| 5,110,226 A | * | 5/1992 | Sherman et al. | 400/88 |
| 5,287,525 A | | 2/1994 | Lum et al. | 713/300 |
| 5,300,874 A | | 4/1994 | Shimamoto et al. | 320/15 |
| 5,339,445 A | | 8/1994 | Gasztonyi | |
| 5,452,401 A | | 9/1995 | Lin | |
| 5,454,111 A | | 9/1995 | Frame et al. | |
| 5,483,656 A | | 1/1996 | Oprescu et al. | |
| 5,504,413 A | | 4/1996 | Fernandez et al. | 320/163 |
| 5,572,685 A | | 11/1996 | Fisher et al. | |
| 5,661,645 A | * | 8/1997 | Hochstein | 363/89 |
| 5,675,813 A | * | 10/1997 | Holmdahl | 713/300 |
| 5,721,481 A | * | 2/1998 | Narita et al. | 320/34 |
| 5,754,868 A | * | 5/1998 | Yamamoto et al. | 713/300 |
| 5,799,196 A | * | 8/1998 | Flannery | 713/320 |

OTHER PUBLICATIONS

"DV2043S7—Level 3 Smart Charger with Dual Battery Selector", Product Information and Technical Data prepared by BENCHMARQ Microelectronics, Inc., pp. 1–8 (Aug. 1996).

"The Complete Motorola Microcomputer Data Library", Product Information and Technical Data prepared by the Technical Information Center of Motorola, Inc., Cover page, Intro page and pp. 1–56 to 1–63 (1978).

* cited by examiner

Primary Examiner—Ayaz Sheikh
Assistant Examiner—Frantz B. Jean
(74) Attorney, Agent, or Firm—Kenneth Cool; Eduardo E. Drake; Schwegman Lundberg Woessner & Kluth

(57) ABSTRACT

A computer system typically includes a central computer and several peripherals, such as a mouse and a printer, which communicate with the computer via a communications channel known as a serial bus. The serial bus may also supply a limited amount of power to some peripherals. Unfortunately, the power limit compels high-power peripherals to include independent power supplies, an arrangement which increase their complexity and cost. Accordingly, one embodiment of the present invention provides a bus-powered peripheral that includes a controller, a rechargeable battery, and a voltage regulator or recharge circuit. The recharge circuit monitors data on a serial bus, recharges the battery during inactive periods, and allows the battery to supplement bus power during active periods, thereby overcoming the power limit of the serial bus.

12 Claims, 3 Drawing Sheets

BUS-POWERED COMPUTER PERIPHERAL WITH SUPPLEMENT BATTERY POWER TO OVERCOME BUS-POWER LIMIT

FIELD OF THE INVENTION

The present invention concerns computer systems and computer peripherals, particularly a system that recharges a battery-powered peripheral through a serial bus.

BACKGROUND OF THE INVENTION

Computer systems, particularly personal computers, typically include a central processing unit and a number of peripherals, or auxiliary devices, such as monitors, keyboards, mice, disc drives, printers, scanners, and even cameras, which communicate with the central processing unit. The central processing unit and the peripheral devices are usually connected via a two-way communications channel, known as a serial bus, which carries a stream of electrical pulses representing a sequence of ones and zeros. The serial bus may also carry electrical power for operating one or more peripherals.

Serial bus parameters, or specifications, are usually standardized not only to reduce the number of communications protocols, or procedures, a computer must understand, but also to simplify matching of computers and peripherals. Examples of serial bus specifications include Apple desktop bus (ADB), Access.bus (A.b), Institute of Electrical and Electronic Engineers (IEEE) P1394, Concentration Highway Interface (CHI), and GeoPort.

Within the past few years, a new serial bus specification, called the Universal Serial Bus (USB) Specification, has been developed to work with peripherals that require higher data rates, more flexibility, or less complexity than previously available in standard serial busses. A Universal Serial Bus, a serial bus that operates according to the USB Specification, has a maximum data rate of 12 million bits per second (12 Mbps), and carries as much as 2.5 watts of electric power to operate USB peripherals (that is, USB-compliant peripherals).

One problem with the USB and other serial bus specifications are the power limits they impose on bus-powered peripherals, peripherals that operate almost entirely on power carried by a serial bus. Because of the power limits, high-power peripherals, such as printers or speakers, that require more than the power limit for a particular serial bus must use separate, external power supplies. Unfortunately, external power supplies add expense and complexity to peripherals.

Accordingly, there is a need for a better way of powering high-power computer peripherals.

SUMMARY OF THE INVENTION

To address this and other needs, the present invention provides a peripheral with a rechargeable battery that stores energy during inactive periods for use during active periods. In one exemplary embodiment, the peripheral includes a voltage regulator for coupling to a pair of bus power lines; a controller coupled between the voltage regulator and one or more bus data lines; and a rechargeable battery coupled to the voltage regulator. In operation, the controller switches the battery between a charge mode and a supply mode according to signals received through the bus data lines. The charged battery supplements the power available through the bus power lines, thereby providing more power for operating the peripheral than otherwise available over the bus power lines alone.

Another embodiment packages the supplemental power capabilities as a power-extension or power-enhancement peripheral for connection between a computer and another peripheral. And, yet another embodiment, which lacks a controller, relies on rechargeable battery coupled in parallel with a primary-function module of the peripheral. The rechargeable battery responds automatically to power demands of the primary-function module to supply supplemental power during high-power-demand periods and to store excess power during low-power-demand periods.

DESCRIPTION OF THE PREFERRED EMBODIMENTS

The following detailed description, which references and incorporates FIGS. 1–4, describes and illustrates specific preferred embodiments, or versions, of the invention. These embodiments, offered not to limit but only to exemplify and teach the invention, are shown and described in sufficient detail to enable those skilled in the art to practice the invention. Thus, where appropriate to avoid obscuring the invention, the description may omit certain information known to those of skill in the art.

Figure 1:
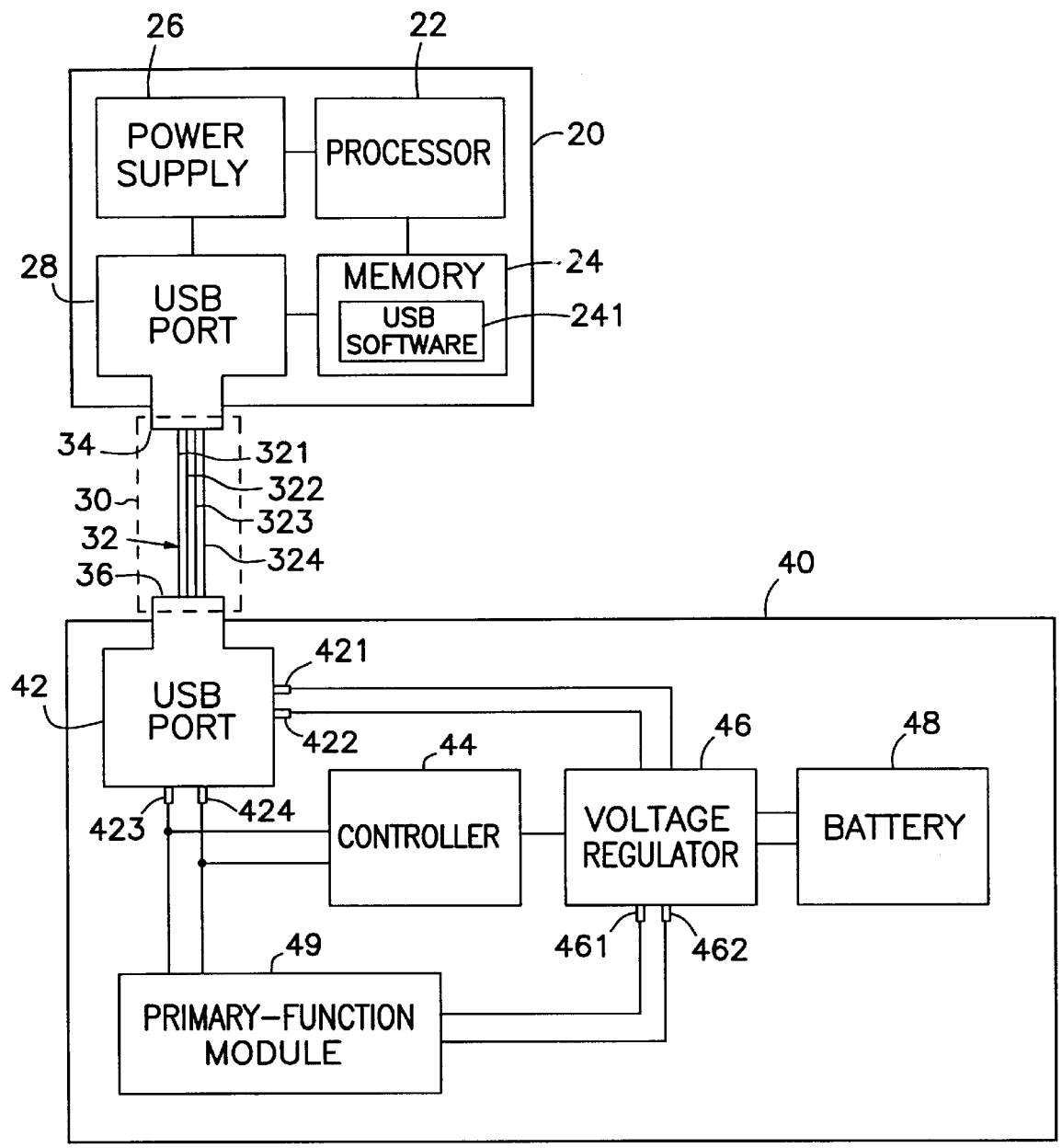
FIG. 1 is a block diagram of a first computer system including a computer peripheral with rechargeable battery.

FIG. 1 shows a personal computer system 10, which includes a personal computer 20, a Universal Serial Bus (USB) 30, and a USB peripheral 40. Computer 20, preferably a Gateway 2000 personal computer from Gateway 2000, Inc. of North Sioux City, S. Dak., includes a processor 22; a memory 24, which includes Universal Serial Bus (USB) communications software 241; a power supply 26, which converts 110 VAC to 5 volts DC; and a USB port 28, which follows the USB Specification 1.0 (Final Revision of Nov. 13, 1995) or an earlier or subsequent version. The USB Specification is incorporated herein by reference.

USB port 28 connects to USB serial bus 30. USB serial bus 30 includes a USB cable 32 which terminates at one end (computer end) with USB connector 34 and at its other end (peripheral end) with USB connector 36. In accord with the USB Specification, cable 32, which has 90-ohm impedance, includes four insulated wires 321–324. Wires 321 and 322 provide respective nominal voltages of 5 volts and return ground, and carry a maximum of 2.5 watts of power. Wires 323 and 324 are differential data lines that carry differential data signals as well as an NRZI-encoded clock signal. Connector 34, at the computer end of cable 32, mates with USB port 26, and connector 36, at the peripheral end, mates with USB port 42 of USB peripheral 40.

Port 42 includes not only power terminals 421 and 422 which connect respectively to wires 321 and 322, but also data terminals 423 and 424 which connect respectively to wires 323 and 324. USB peripheral 40 additionally includes an interface-controller module 44, a voltage regulator (or recharge circuit) 46, a rechargeable battery 48, and a primary-function module 49. Interface-controller module 44 is connected to data terminals 423 and 424 of USB port 42.

Power terminals 421 and 422 (of port 42) connect to voltage regulator 46. Voltage regulator 46 connects to battery (or energy-storage device) 48, which includes one or more energy-storage cells (not shown), preferably long-life rechargeable lithium, nickel-cadmium, zinc-bromine, or alkaline-manganese cells with minimum charging hysteresis. In addition, voltage regulator 46 includes output terminals 461 and 462 which are connected to primary-function module 49.

Primary-function module 49 includes the primary circuits and components necessary for the USB peripheral to perform its intended function. For example, USB peripheral 40 may be a printer, and module 49 would thus include the buffers, print heads, motors, etc. for a complete printer. Alternatively, USB peripheral 40 may also be a pair of speakers, with each speaker including a digital-to-analog converter, an amplifier, volume controls, and an audio transducer. Ultimately, the invention encompasses any type of computer peripheral, including high-power peripherals that require more power than available through bus 30.

In operation, interface-controller module 44 monitors and decodes data received at data terminals 423 and 424. If it receives data indicating or invoking an inactive period, for example, data instructing that the peripheral be turned off, it sends a control signal to voltage regulator 46. The control signal invokes a charge mode in voltage regulator 46. In the charge mode, voltage regulator 46 diverts power away from primary-function module 49 to battery 48, thereby charging battery 48.

On the other hand, if interface-controller module 44 receives data indicating or invoking an active period, such as data instructing that the peripheral be turned on, it sends a different control signal to voltage regulator 44. The different control signal invokes a supply mode during which module 44 couples battery 48 to primary function module 49, allowing battery 48 to provide supplemental power to primary-function module 48. Thus, during the supply mode, primary-function module 48 receives power not only from computer 20 (via bus 30), but also from battery 48, thereby overcoming the 2.5-watt power limit of bus 30.

In another embodiment, voltage regulator 46 monitors power drawn by primary-function module 49 against that available through serial bus 30. If excess power is available, that is, if more power is available than power being drawn, voltage regulator 46 invokes a variable-trickle-charge mode which charges battery 49 at a rate proportionate to, or at least dependent on, the amount of excess power. Consequently, battery 49 keeps a charge sufficient to consistently satisfy the peak power demands of primary-function module 48.

Figure 2:
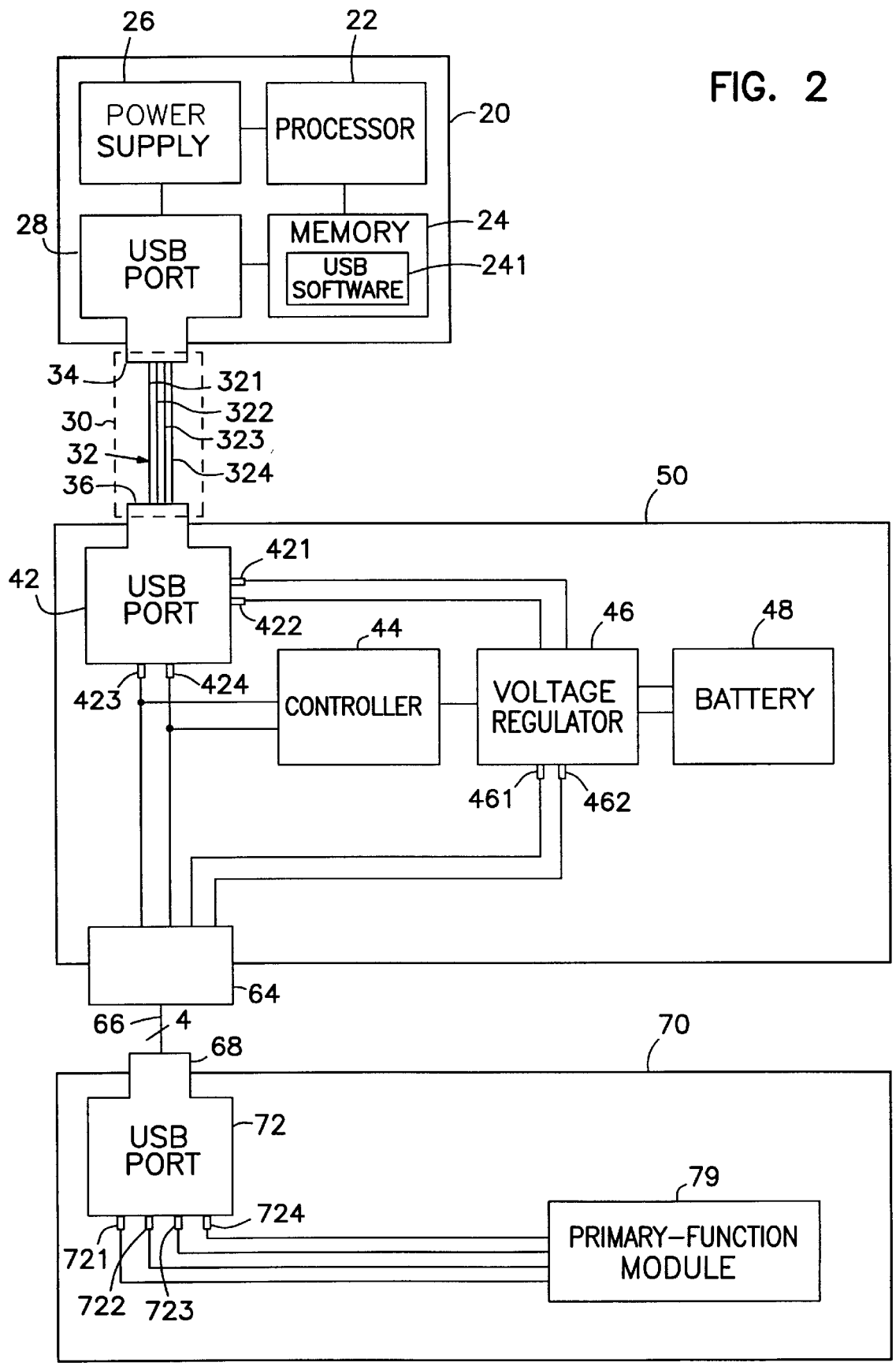
FIG. 2 is a block diagram of a second computer system including a power-extension peripheral connected between a computer and a USB bus-powered peripheral.
Figure 3:
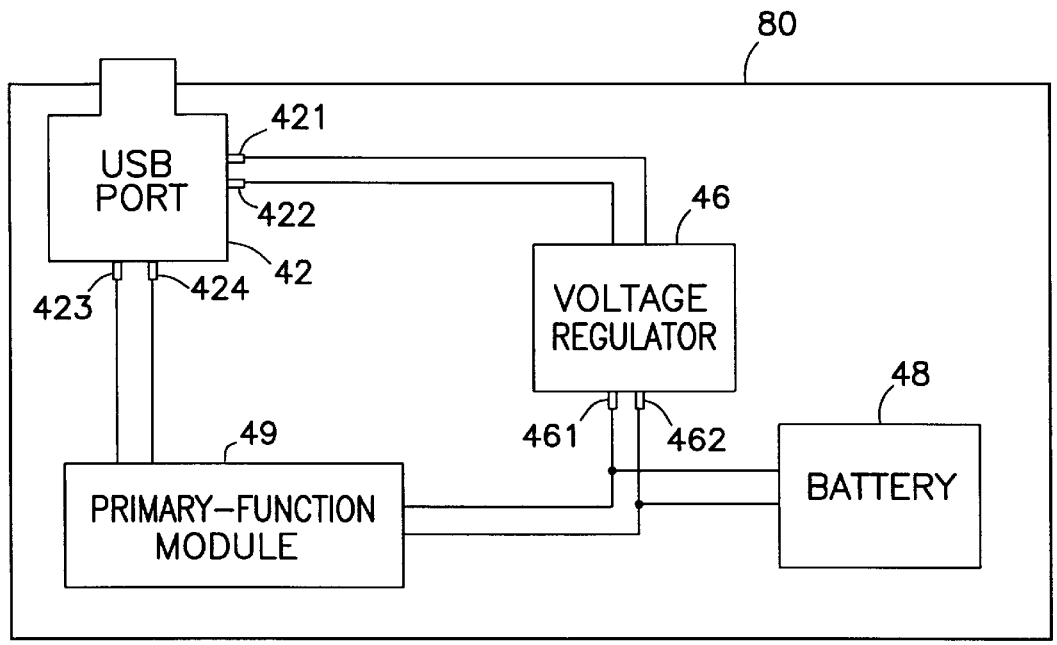
FIG. 3 is a block diagram of another embodiment of a computer peripheral having a rechargeable battery.
Figure 4:
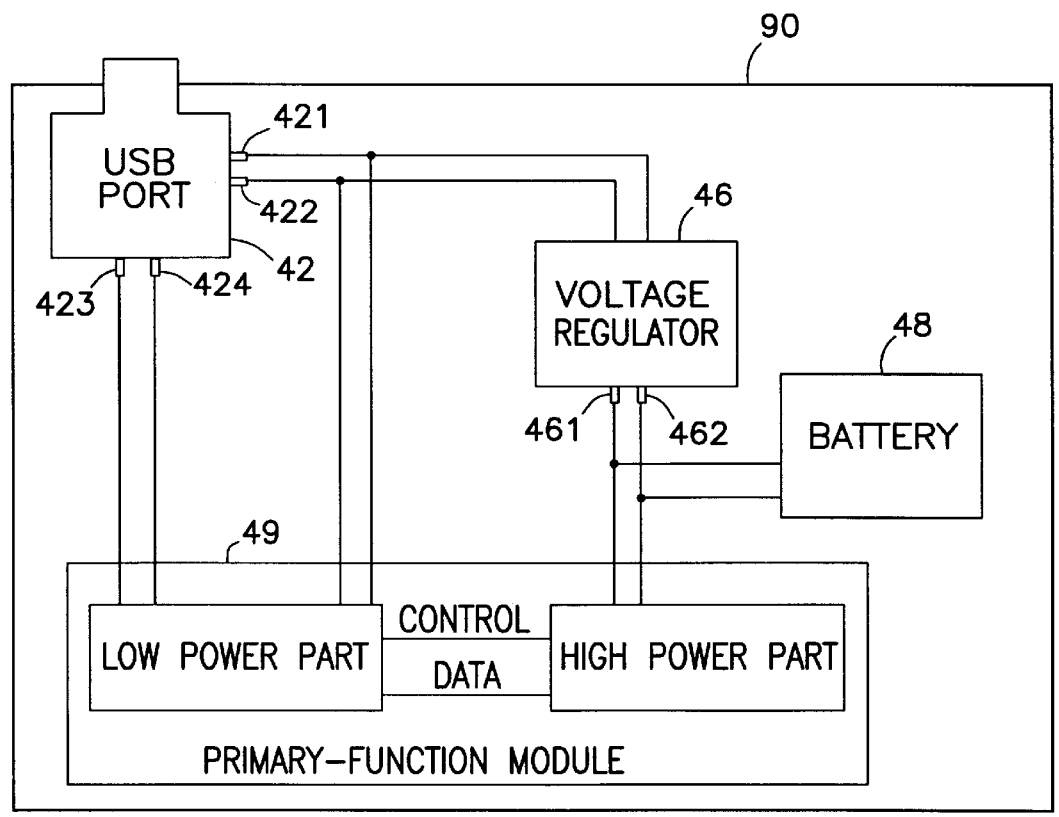
FIG. 4 is a block diagram of another embodiment of a computer peripheral having a rechargeable battery.

FIGS. 2–4 show three other embodiments of the invention. In particular, FIG. 2 shows a system 100 in which USB peripheral 50 functions solely as an in-line power-extension (or power-enhancement) peripheral for a separate high-power peripheral 70. The major difference between peripherals 40 and 50 is that peripheral 50 lacks primary-function module 49 and outputs power and data through a USB connector 64. Connector 64 is connected via a USB cable 66 to another USB connector 68. Connector 68 engages USB port 72 of peripheral 70. Port 72, substantially identical in structure and function to port 42, has four output terminals 721–724 connected to a primary-function module 79. Module 79 is substantially identical in structure and function to module 49.

In operation, the peripheral 50 operates much like peripheral 40. More precisely, port 42 and controller 44 of power-extension peripheral 50 decode and monitor data on bus 30.

If controller 44 detects data indicating or invoking an inactive period for peripheral 70, it directs regulator 46 to divert power away from connector 64 and thus away from peripheral 70 to charge battery 48. On the other hand, if controller 44 detects data indicating or invoking an active period for peripheral 70, it allows battery 48 to provide supplemental power through connector 64, cable 66, and connector 68 to peripheral 70, thereby overcoming the 2.5-watt power limit of bus 30. Furthermore, two or more substantially similar power-extension peripherals can be connected in parallel to provide even more supplemental power to a given high-power peripheral.

FIG. 3 shows another embodiment of high-power peripheral 40, designated 80. Peripheral 80 includes many of the same or similar components as peripheral 40, namely USB port 42, voltage regulator 46, battery 48, and primary-function module 49. Notably, peripheral 80 lacks controller 44 for monitoring and detecting bus data indicative of active or inactive operating periods. Instead, peripheral 80 has battery 48 connected in parallel with output terminals 461–462 of voltage regulator 46 to "sense" the current drawn by primary-function module 49. During low power-demand periods, excess bus power (that is, bus current not drawn by module 49) charges battery 48 as necessary, and during high power-demand periods, battery 48 supplies supplemental power to primary-function module 49. Thus, like peripherals 40 and 70, peripheral 80 overcomes the 2.5-watt power limit of bus 30.

FIG. 4 shows another embodiment of high-power peripheral 40, designated 90. Peripheral 90 includes many of the same or similar components as peripheral 40, specifically USB port 42, voltage regulator 46, battery 48, and primary-function module 49. However, primary-function module 49 has been divided, preferably according to power requirements, into two portions: a low-power portion 49a which receives power and data only from USB port 42, and a high-power portion 49b which receives power from both USB port 42 and battery 48.

Low-power portion 49a preferably includes control logic and circuits for operating high-power portion 49b, and, high-power portion 49b includes one or more transducers for converting electrical energy into another form of energy essential to the function of the peripheral. For example, high-power portion 49b could include a motor which converts electrical energy to kinetic energy, or a light source which converts electrical energy to light, or a speaker which converts electrical energy to an acoustic energy. However, the scope of the invention encompasses any convenient division of a peripheral into first and second portions with the second portion connected to receive supplemental battery power.

Peripheral 90 has battery 48 connected in parallel with output terminals 461–462 of voltage regulator 46 to sense the current load of only the high-power portion 49b, which is activated or deactivated via a control line from low-power portion 49a. Thus, when low-power portion 49a activates high-power portion 49b, battery 48 supplies supplemental power to primary-function module 49, and when low-power portion 49b deactivates high-power portion 49b, excess bus power charges battery 48. Therefore, like peripherals 40, 50, and 80, peripheral 90 overcomes the power limit of bus 30.

CONCLUSION

The present invention provides several embodiments of bus-powered peripherals, including a power-extension peripheral, which overcome the 2.5-watt power limitation imposed by the USB Specification. Ultimately, the invention, applicable to any communications bus, eliminates the need to provide a separate external power supply in many high-power computer peripherals.

The embodiments described above are intended only to illustrate and teach one or more ways of practicing or implementing the present invention, not to restrict its breadth or scope. The actual scope of the invention, which encompasses all ways of practicing or implementing the invention, is defined only by the following claims and their equivalents.

What is claimed is:

1. A system comprising:
   a computer;
   a bus having at least a pair of data lines for communicating data and at least a pair of power lines for supplying power according to a predetermined power limit; and
   a peripheral coupled to the computer via the bus to receive data and power, the peripheral including:
   a rechargeable battery;
   a communications port having two power terminals for coupling to the pair of power lines and having two data terminals for coupling to the pair of data lines;
   a voltage regulator coupled to the power terminals and the rechargeable battery;
   a primary-function module coupled to the voltage regulator; and
   a controller coupled to at least one of the two data terminals and to the voltage regulator, the controller responsive to signals at the data terminals, indicating an inactive period, to switch the voltage regulator to a charge mode during which it charges the rechargeable battery and responsive to signals at the data terminals, indicating an active period, to switch the voltage regulator to a battery supply mode during which it transfers energy from the rechargeable battery and from the power lines to the primary-function module, thereby providing the primary-function module power in excess of the predetermined power limit.

2. The computer peripheral of claim 1, wherein the primary-function module includes components of a printer, scanner, fax machine, or speaker.

3. A system comprising:
   a computer for processing data;
   a bus, coupled to the computer, for communicating data;
   a power supply for supplying a limited amount of power;
   power-extension means, coupled to the computer via the bus and to the power supply and including a supplemental power source, for supplying more than the limited amount of power; and
   a computer peripheral coupled to the bus via the power-extension means to receive power concurrently from the power supply and the supplemental power source, and thus able to receive more than the limited amount of power.

4. The system of claim 3, wherein the power supply is part of the computer.

5. The system of claim 3, wherein the supplemental power source comprises a rechargeable battery and the power-extension peripheral further comprises:
   a power terminal coupled to the power supply;
   a data terminal coupled to the computer to receive signals;
   a voltage regulator coupled to the power terminal and the rechargeable battery, and having an output terminal coupled to the computer peripheral; and
   a controller coupled to the voltage regulator and responsive to signals at the data terminal to switch the voltage regulator between a charge mode that connects the rechargeable battery to the power terminal for recharge and a supply mode that connects the rechargeable battery and the power terminal to the output terminal for supplying power concurrently from both the battery and power supply to the computer peripheral.

6. A method of operating a computer peripheral connected to a computer via a bus having a predetermined nominal power limit, the method comprising:
   transferring power and data via the bus to the computer peripheral;
   operating at least a part of the peripheral with power transferred via the bus; and
   charging a battery with at least a portion of the power transferred via the bus; and
   concurrently supplying first and second amounts of power to the part of the peripheral, with the first amount transferred via the bus and the second amount derived from the charged battery, and with a sum of the first and second amounts exceeding the nominal power limit.

7. The method of claim 6, wherein operating at least a part of the peripheral and charging the charging the battery occur concurrently.

8. An apparatus comprising:
   a peripheral device for communicating with a host device via a peripheral device bus, the peripheral device being capable of communicating with the host device via the peripheral device bus and further being capable of receiving operational power via the peripheral device bus; and
   a controller for causing a battery to be charged via the peripheral device bus during a lower power consuming period of the peripheral device, the controller causing the battery to provide supplemental power to the peripheral device in the event the peripheral device requires operational power at a level greater than a specified power limit of the peripheral device bus.

9. An apparatus as claimed in claim 8, wherein while being charged via the peripheral bus, the battery is charged at a rate within the specified power limit of the peripheral device bus.

10. An apparatus as claimed in claim 8, wherein while the peripheral device requires operational power greater than the limit of the peripheral device bus, the battery and the peripheral device bus simultaneously provide operational power to the peripheral device without causing the peripheral device bus to provide power at a level greater than the limit of the peripheral device bus.

11. An apparatus as claimed in claim 8, the peripheral device being capable of operating at a power level greater than the limit of the peripheral device bus without causing the peripheral device bus to provide power beyond the limit by receiving supplemental power from the battery.

12. An apparatus as claimed in claim 8, the controller causing the battery to cease providing supplemental power to the peripheral device in the event the peripheral device requires operational power at a level within the limit of the peripheral device.

* * * * *